(12) United States Patent
Kratimenos

(10) Patent No.: US 11,421,820 B2
(45) Date of Patent: Aug. 23, 2022

(54) SKATEBOARD MOUNT

(71) Applicant: Anastasios Kratimenos, Merrillville, IN (US)

(72) Inventor: Anastasios Kratimenos, Merrillville, IN (US)

( * ) Notice: Subject to any disclaimer, the term of this patent is extended or adjusted under 35 U.S.C. 154(b) by 0 days.

(21) Appl. No.: 17/016,373

(22) Filed: Sep. 10, 2020

(65) Prior Publication Data

US 2022/0074540 A1  Mar. 10, 2022

(51) Int. Cl.
*F16M 13/02* (2006.01)
*A63C 17/00* (2006.01)
*A47F 5/08* (2006.01)
*F16M 11/04* (2006.01)

(52) U.S. Cl.
CPC ........... *F16M 13/02* (2013.01); *A47F 5/0853* (2013.01); *A63C 17/0006* (2013.01); *F16M 11/04* (2013.01); *A63C 2203/44* (2013.01)

(58) Field of Classification Search
CPC .............. A47F 5/0853; A63C 17/0006; A63C 2203/44; F16M 11/04; F16M 13/02
See application file for complete search history.

(56) References Cited

U.S. PATENT DOCUMENTS

| | | | | |
|---|---|---|---|---|
| 5,120,012 | A * | 6/1992 | Rosenau | A63C 17/00 211/89.01 |
| 5,826,908 | A * | 10/1998 | McBride | A63C 11/028 280/814 |
| 6,631,813 | B1 * | 10/2003 | Walter | A47F 5/0815 211/123 |
| D499,594 | S * | 12/2004 | Laitila | D6/552 |
| 7,284,671 | B1 * | 10/2007 | Doscher | A63B 71/0036 211/59.1 |
| 7,721,900 | B2 * | 5/2010 | Waterman | A47F 7/0028 211/70.5 |
| 7,950,535 | B1 * | 5/2011 | Schmid | A47F 7/0021 211/85.7 |
| 8,453,853 | B1 * | 6/2013 | Adams | A47F 7/00 211/85.7 |
| 8,540,197 | B1 * | 9/2013 | Krol, II | A63C 17/0006 248/206.5 |
| 8,939,297 | B2 * | 1/2015 | Berman | A63C 11/028 211/85.7 |
| 9,291,304 | B1 * | 3/2016 | Tu | F16M 13/02 |
| 9,707,469 | B2 * | 7/2017 | Roland | A63C 17/012 |
| D904,173 | S * | 12/2020 | Jin | D8/354 |

(Continued)

*Primary Examiner* — Patrick D Hawn
(74) *Attorney, Agent, or Firm* — Peter Willis

(57) ABSTRACT

A quick install skateboard hanging device designed to lower damage to the wall, the skateboard deck, and the graphic design on the skateboard deck. The hanger is configured to allow for small adjustments in any direction to the positioning after the first installation. Hanger device includes a base, a set of pins, and a set of adhesive or hook and loop strips for attaching the base to the wall.

The product has optional install methods of drywall hooks, screws, and drywall anchors. With an oval hole for the screw/screw in drywall anchors in the hanger, the hanger can be adjusted in one direction without having to put another hole in the wall. This feature is especially important when hanging a board horizontal. It allows the horizontally displayed board to be adjusted to be perfectly level.

11 Claims, 5 Drawing Sheets

(56) References Cited

U.S. PATENT DOCUMENTS

| | | | |
|---|---|---|---|
| 2002/0144962 A1* | 10/2002 | Dettorre | A63C 11/028 |
| | | | 211/85.7 |
| 2008/0083684 A1* | 4/2008 | Pfeiffer | A63C 11/028 |
| | | | 211/85.7 |
| 2012/0006766 A1* | 1/2012 | Mackay, Jr. | E05B 73/0094 |
| | | | 211/4 |
| 2013/0048821 A1* | 2/2013 | Leet | A63B 71/0045 |
| | | | 248/316.4 |
| 2021/0106151 A1* | 4/2021 | Freeborn | A47G 1/16 |

* cited by examiner

SKATEBOARD MOUNT

BACKGROUND OF THE INVENTION

The present invention is in the technical field of skateboards. More particularly, the present invention is in the technical field of skateboard accessories. More particularly, the present invention is in the technical field of skateboard hangers.

Skateboarders often hold a great reverence for their boards and like to display them on walls like artwork in a floating position. In this position the board is generally supported in the central area of the board around a couple of inches or so off of the wall, however due to the curvature of the board the nose or tail of the board may touch the wall. This position highlights the graphic artwork and designs (also called the Graphic) imprinted on them. When attaching the board to the wall or a hanger the use of grooved metal rods or anchors with sharp edges can damage the Graphic.

Prior art designs for devices intended to hang and display skateboards generally involve the use of threaded bolts and nuts that attach through the holes intended for mounting the wheel assembly with screw on nuts attached to alternate sides of the board. Alternative designs for the display of skateboard decks involve the use of a shelving type system where a skateboard deck is laid on it at an angle.

SUMMARY OF THE INVENTION

The current invention is a skateboard hanger. The hanger comprises support pins that are configured to hang the skateboard deck in a stable position meanwhile keeping the skateboard deck and wrapping plastic as free from damage as possible. The surface of the support pins is smooth but can pierce the plastic wrapping with only a small hole over the mounting holes. This small hole in the plastic wrap remains over the mounting holes in the skateboard deck.

A quick install skateboard hanging device designed to lower damage to the wall, the skateboard deck, and the graphic on the skateboard deck. The hanger is configured to allow small adjustments to the positioning after the first installation. Hanger device includes a base, a set of pins, and a set of adhesive or hook and loop strips for attaching the base to the wall. The product has optional install methods of drywall hooks, screws, and drywall anchors. With the oval hole in the hanger, the hanger can be adjusted in one direction without having to put another hole in the wall. This feature is especially important when hanging a board horizontal. It allows the board to be adjusted to be perfectly level.

Pins are bound together with a base containing a minimum of supporting materials, with sets of slots that will support the pins holding the skateboard deck. Each set of slots is positioned to line up with the mounting holes of the skateboard deck of interest. The base is attached to the wall with either an adhesive or some sort of drywall anchor. The base is also configured to be quickly placed and leveled with features such as the position indicators and bubble levels. The preferred use of the position indicators is to use them to line up and align multiple hangers. Or more preferred, position indicators may be used to assist in the alignment with marks placed on the wall which can be beneficial when installing multiple hangers to align a series of skateboards.

This invention is used for hanging a typical skateboard deck on a wall with the graphic showing and minimal hardware. This invention can be used with most skateboard shapes including the "popsicle", "old school" and "long board". This hanger is designed to be able to hang most types and sizes of skateboard decks. Most skateboard decks weigh 7 lbs or less and are not shaped in a way that prevents them from being mounted via this skateboard deck hanger. Some configurations of the hanger and pins composition allow for heavier skateboard decks and skateboards with the wheel assembly.

BRIEF DESCRIPTION OF THE DRAWINGS

FIG. 4 is a side view of a pin type a.

DETAILED DESCRIPTION OF THE INVENTION

Figure 1:
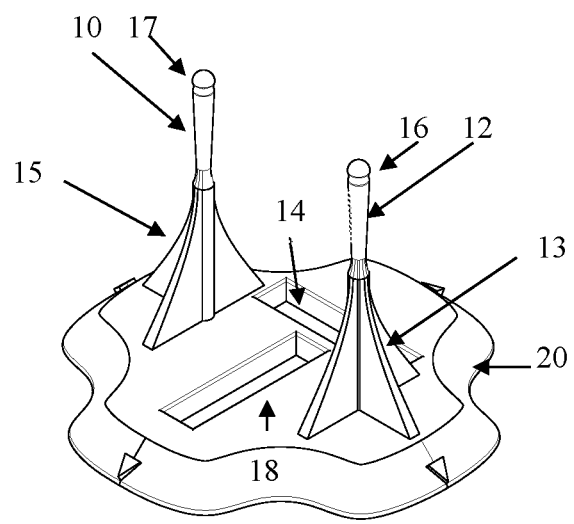
FIG. 1 is a perspective view of the one piece skateboard hanger.

The skateboard hanger in FIG. 1 is one piece with a set of members called pins. The pins have a smooth surface and are sealed into the base 20 in a fusion joint. The bottom portion of the pins 13, 15 is comprised of 3 triangular shaped flanges extending from the center rod with the large end of the triangle making a T-shaped footprint on the surface of the base 20. Rectangular cavities 14, 18 are placed between the 2 pins and may be used to place bubble levels to aid in the placement of the hanger.

A skateboard deck can be placed on the skateboard hanger with the pins inserted into the mounting holes and can rest against the edge of the bottom portion 13, 15 of the pin. This edge is near the center of the pin. Rising from the center of the pin is a top portion 10, 12. The top portion is thin and has a rod like shape with a diameter that is smallest near the center and gets larger toward the tip of the top portion of the pin near 16, 17. The top portion is the part that is inserted into the mounting holes of the skateboard deck. Near the tip of the top portion of the pin is a small decrease in the diameter of the rod 16, 17. This small groove goes all the way around the pin and is configured to stabilize the position of an O-ring.

The hanger can be constructed from plastic, metal, carbon fiber or a variety of other materials. When the hanger is constructed from plastic, a clear polycarbonate is preferred. The strength requirement of the pin materials is for the weakest point of the pin to withstand the sheering force of a typical skateboard deck without a breakage. Coatings can be used to either strengthen or smooth the surface of the pin.

Figure 2:
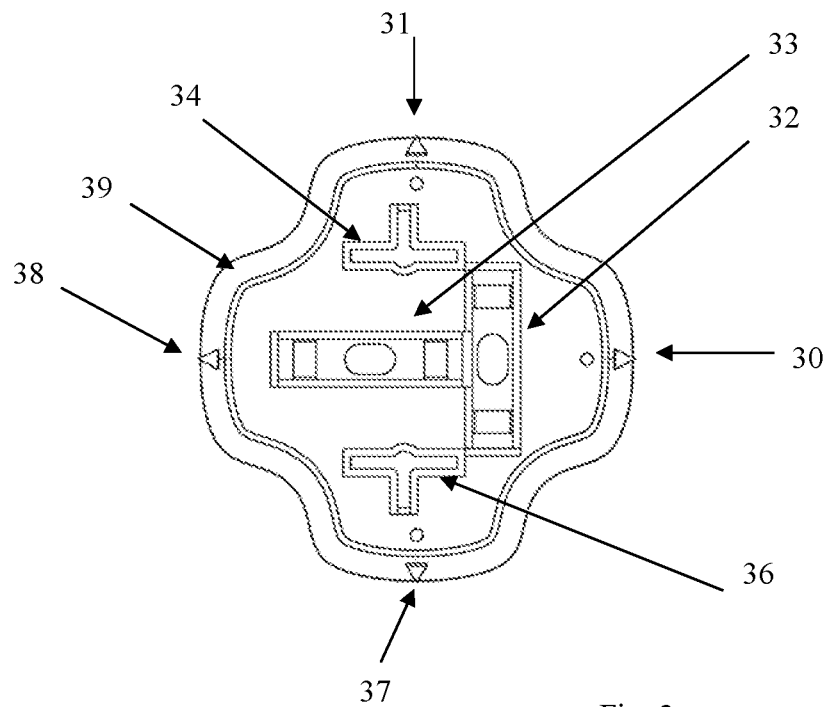
FIG. 2 is a head on view of a modular base without pins.

Referring now to the invention shown in FIG. 2 the base of the hanger resembles a rounded plus shape. This is a modular embodiment of the hanger wherein; the components can be inserted into the required slots. The base of the hanger has a raised edge 39 that runs all the way around the base of the hanger, with a set of triangular arrows that mark the middle top 31, middle bottom 37, middle right 30, and middle left 38 points of the plus. In the center of the base are 2 cavities which resembles a sideways T formation 33, 32 wherein each insert cavity may contain a bubble level. These cavities are raised from the surface of the base of the hanger. There is also an oval hole beneath each bubble level holder which can be used when the bubble level holder is popped out. This oval hole can be used with screws or screw like drywall anchors to affix the skateboard hanger to the wall. The T formation 33, 32 is aligned perpendicular to the axis 31, 37 of the hanger base. The pins are attached to the base with a modular joint to a set of slots that resembles an upside down T 34, or a right side up T 36 with a small bulge in the middle. The top and bottom alignment indicators 31, 37 assists in positioning and leveling the hanger in one direction. Right and left alignment indicators 30, 38 assists in the positioning and leveling of the hanger in the other direction. If two or more hangers are used the alignment indicators assist in the alignment of the hangers.

Further referring to the invention shown in FIG. 2 the raised edge 39 gradually rises from the outside edge to a point inside the base of the skateboard hanger. Inside the raised edge is an area where the thickness of the base of the hanger is reduced. This area of reduced thickness is suitable for a graphic insert.

Further referring to the invention shown in FIG. 2, the base of the skateboard hanger has a flat back suitable for 1 or more hook and loop style adhesive strips to be applied vertically in a side by side fashion. Due to the rectangular wheel assembly mounting pattern on typical skateboard decks, the skateboard hanger is rotated depending on if a person would like to hang a skateboard deck vertical or horizontal. The adhesive strips are designed to be used in a vertical orientation on the wall (long ways in the direction of the floor and ceiling). With the "plus" shape, the adhesive strips will be placed in a vertical orientation which changes to accommodate the preference of a vertical or horizontal display of the skateboard deck. Note that one hanger is needed to hang a skateboard deck vertically and two skateboard hangers are needed to hang a skateboard deck horizontally.

Further referring to the invention shown in FIG. 2, if the base is placed against the wall as shown, a bubble level in the bubble level holder 33 will be used to indicate if the axis between 38 and 30 is level and whether or not the tops of the pins are aligned up and down. When the invention is positioned as shown in FIG. 2, a set of 2 hangers can be arranged horizontally from each other allowing the skateboard deck to be positioned horizontally. In this position the pins of each skateboard hanger pass through a set of mounting holes on either side of the skateboard deck. The pins will protrude through the mounting holes to just beyond the surface of the skateboard deck. This arrangement allows for the use of the position indicators to indicate where the user wants the skateboard deck placed and if the two hangers, are lined up. If the hanger is turned 90 degrees counterclockwise the other a bubble level in bubble level holder 32 can be used to indicate whether an axis along the triangular indicators 31-37 is level. This is the position to hang a skateboard deck vertically. Only one hanger is needed to hang a skateboard deck from this position.

The form of and shape of the raised edge and alignment indicators does not preclude other shapes that fulfill a similar purpose and function. For example, the width of the outside edge may be significantly larger than a point, and the alignment indicator may be comprised of ink. Also not precluded from this invention are shapes other than the shown rounded plus shape that the raised edge follows. Other acceptable shapes for the raised edge to follow include round, square, and oval, and other shapes with symmetry that does not preclude the proper alignment of the hanger elements.

Figure 3:
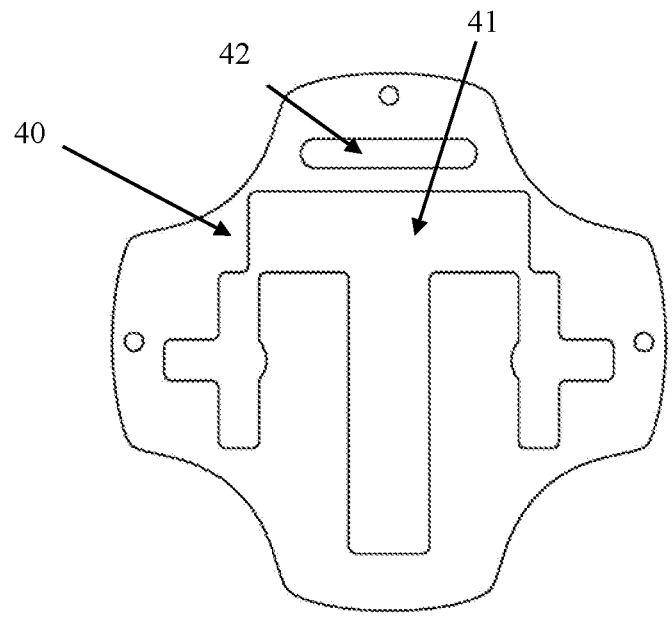
FIG. 3 is a head on view of an insert that fits into the base of FIG. 2.

Referring now to the invention shown in FIG. 3 a graphic insert 40 can be placed in a modular base or in a one piece hanger base. The holes in the insert 41 match up with the features in the base or as seen here, the features of FIG. 2. There may also be trademarks and logos that can be seen through the other hole 42 in the insert. The area in the center of the hanger base can be recessed to make room for a graphic insert 40. The graphic insert can be solid color or decorated with a graphic design.

Further referring now to the invention shown in FIG. 3 the graphic insert 40 fits within the confines of the raised ridge that runs all the way around the base. The raised ridge is around one-half centimeter in width; however, it can be made smaller or larger depending on the aesthetic(s) desired. In the one piece embodiment the insert can be laid in a similar position. This insert will have cutouts for the pins and the bubble levels 41. The size, position, and dimensions of the graphic insert are based on the features of the hanger which are wished to be accentuated or concealed.

Figure 4:
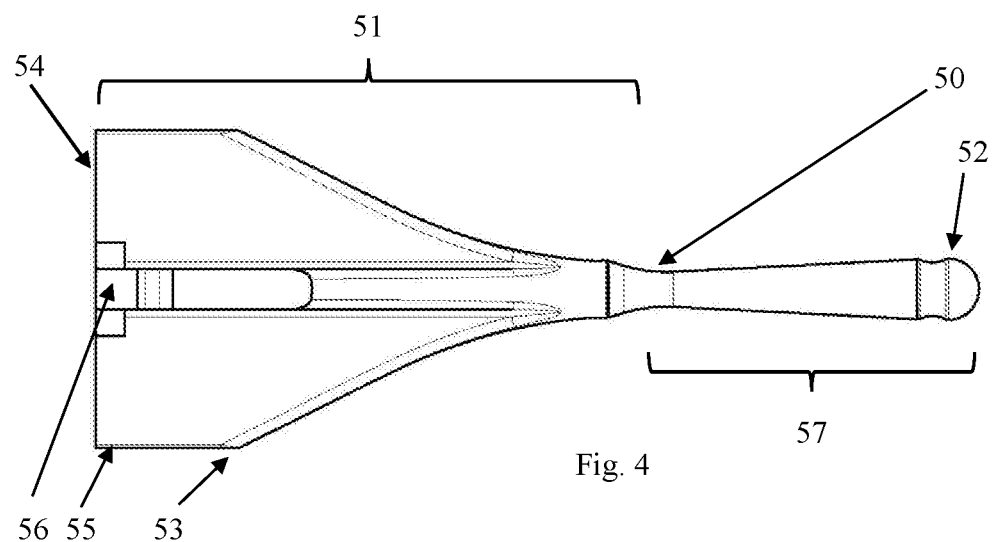

Referring now to the invention shown in FIG. 4 a pin of type a is shown. The pin is configured to fit in a modular base. The bottom portion 51 has 3 flanges 54, 55, 56 that form a T-shaped junction similar in shape to the negative space formed by the slots 34, 36 seen in FIG. 2. The T-shaped junction will fit into the T-shaped slots of the base forming the modular joint. Examples of the T-shaped slots are seen in FIG. 2 34, 36. The bottom portion of the pin has a minimum width at point 50 and gradually gets bigger till it hits point 53 at which point the width is at a maximum. The flanges 54, 55, and 56 are structural in nature helping to support the weight of the skateboard deck. Center flange 56 points away from the other pin when locked into the modular base, with a flexible tab that helps lock the pin into the T-shaped slot. A small ledge opposite flange 56 on the end of the bottom of the center rod of the pin will work together with the tab on flange 56 helping to lock the pin into the T-shaped slot of the modular base.

Further referring to FIG. 4, the top portion of the pin 57, the diameter will gradually get larger from point 50 toward the opposite end of the pin until it hits point 52. At this point there is a small groove that goes all the way around the pin configured to stabilize the position of an O-ring. The O-ring acts as the locking extension in pin a. The top portion of pin type a 57 is the same as seen FIG. 1, but the junction with the base is changed. The resting position of the skateboard deck will generally be either at the minimum radius point 50 or against the O-ring on point 52.

Figure 5:
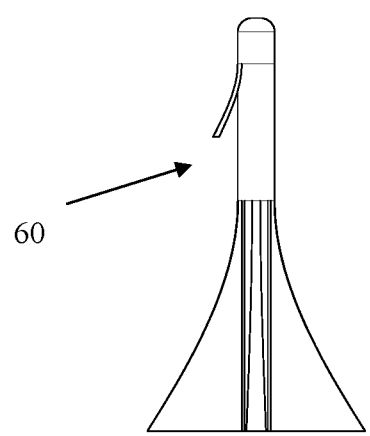
FIG. 5 is a side view of a pin type b.

Referring now to the invention shown in FIG. 5 a pin of type b. Pin type b is shown with a locking extension on the top portion of the pin. This locking extension 60 rises slowly from the tip of the pin on a single side forming a ledge near the middle of the top portion of the pin. The locking extension can pass all the way through the mounting holes. When the pin has been inserted into the mounting holes the skateboard deck rests on the pin and the ledge of the locking extension 60 blocks the skateboard from falling off the pin.

Figure 6:
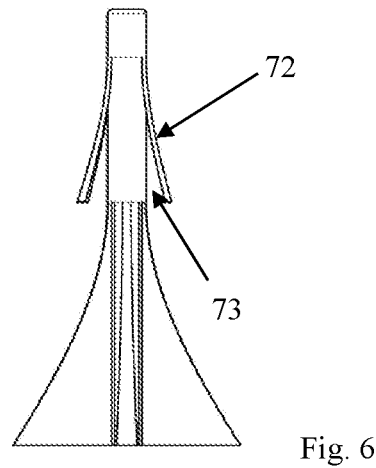
FIG. 6 is a side view of a pin type c.

Referring now to the invention shown in FIG. 6 a pin of type c. Pin type c is shown with a locking extension on the top portion of the pin. This locking extension 72 rises slowly from the tip of the pin on two sides. There is a small gap 73 between the large end of the locking extension and the pin. The locking extension with a gap underneath it is designed with a flexible material in its construction. When squeezed the locking extension 72 can flex to occupy part of the small gap 73. When the pin has been inserted into the mounting holes the locking extension wedges in the mounting holes and the pressure prevents the deck from sliding off the pin.

Figure 7:
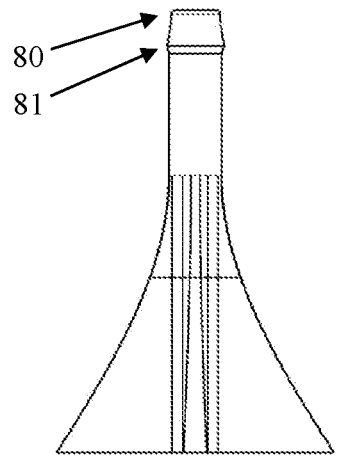
FIG. 7 is a side view of a pin type d.

Referring now to the invention shown in FIG. 7 a pin of type d. Pin type d is shown with a locking extension shown on the tip of the pin. This locking extension has the shape of a lightly sloped conical frustum with the tip of the pin 80 being the small end of the conical frustum and the large end 81 being a small distance from the tip. The pin can easily pass through the mounting holes. When the pin has been inserted into the mounting holes the skateboard deck rests on the pin and the ledge 81 of the conical frustum. This extension blocks the deck from sliding off the hanger. The O-ring is not necessary for the proper functioning of this locking extension.

Figure 8:
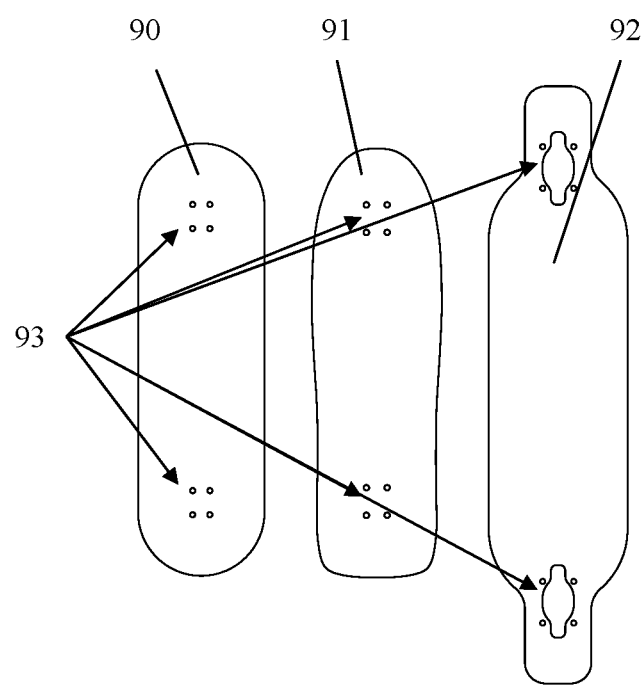
FIG. 8 is a drawing of the common types of skateboards.

FIG. 8 shows the position of the mounting holes 93 in the various types of skateboards. 90 is a popsicle skateboard deck, 91 is an old school skateboard deck, and 92 is a longboard skateboard deck.

Figure 9:
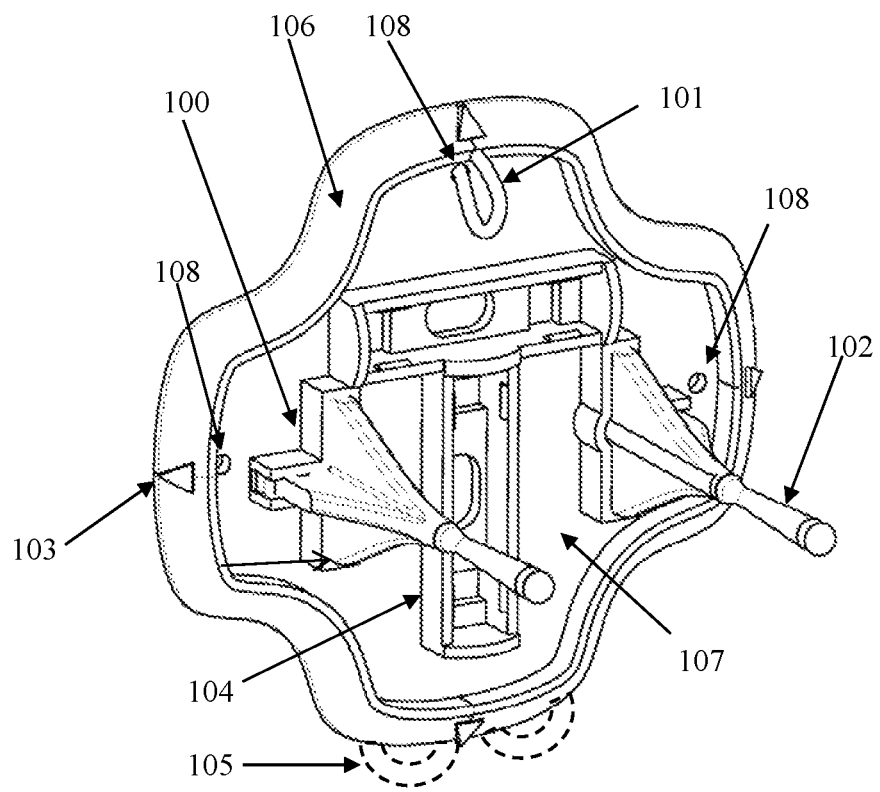
FIG. 9 is a drawing of a modular hanger with a drywall hook.

Referring now to the invention shown in FIG. 9 a modular hanger with the pins 102 inserted into T-shaped slots 100. The hanger base of FIG. 9 is similar to the hanger base in FIG. 2 in shape. It contains the alignment arrows 103 on the raised edge 106 of the hanger base, and the 2 holders for bubble levels 104. On the bottom of the hanger are the tabs for 2 adhesive strips 105 that line up on the back of the hanger. These strips have the capacity to support a typical skateboard deck. For further stability a modified drywall hanging hook 101 can be inserted through the hanger and the drywall. The drywall hook is curved such that it can be threaded through one of the holes 108 positioned at either the top or sides of the hanger shown here. In the present configuration the hook would be positioned as shown. If the hanger is turned on its side, then a new hole 108 would be used. However, in this new position the drywall hook would still be put in the hole on the top, but the pins would be in the top/bottom positions instead of the side to side position. The drywall hook will be a piece of wire that sticks out of hole 108 and makes contact on the raised ridge. Without the adhesive strips the drywall hook can still be used with the functionality that is expected from a drywall hook. The graphic insert of FIG. 2 should be useable for this hanger as shown here. The graphic insert 107 can be modified for use when features like the bubble levels have been removed.

Figure 10:
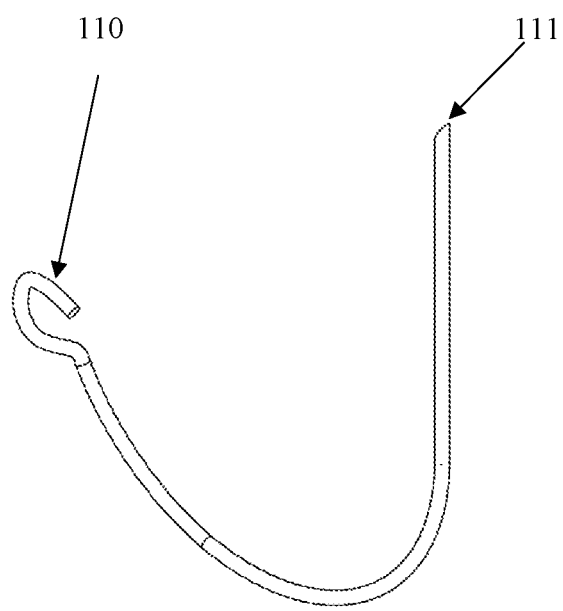
FIG. 10 is a drawing of a drywall hook designed to work with the skateboard hanger.

Referring now to the invention shown in FIG. 10 the drywall hook is shown in full here. The drawing shows the curvature needed to hold a stabilizing position with or without a stabilizing adhesive material applied to the back of the hanger. The drywall hook 110 is curved such that when pushed into the intended hole on the hanger as shown in FIG. 9 (101) the point 111 will embed itself into the back of the drywall stabilizing the hook and the hanger.

The use of a drywall hook, a screw, or a screw type drywall anchor, for attaching a base to the wall, should allow for a wall attachment of heavier skateboards decks and a skateboard with wheel assembly attached. In an alternative attachment of the base to the wall, the oval hole underneath one of the bubble level holders (e.g. FIG. 9 104) would be used with a screw or screw in drywall anchor. The oval hole allows for small adjustments in one direction of the base to be made after an initial installation. When this attachment method is used in combination with metal pins and or pins wherein the locking extension comprises; threading and a nut, enables the use with a fully assembled skateboard. When using a threaded locking extension, the nut would go on the side of the skateboard deck facing away from the wall.

The advantages of the present invention include, without limitation allowing a person to hang a skateboard deck easily using no additional tools, while not damaging the wall. Further, the hanger may include features that simplify the installation process and allow for adjustments to be made to the hanging position in any direction after the skateboard deck was initially hung, without damaging the wall or needing additional tools. The support pins have been designed so that they are ideal for hanging skateboard decks that are still in the wrapping plastic.

The hanger further has the advantage that it can keep the skateboard deck securely placed on the hanger while still allowing a person to intentionally remove and reinstall the skateboard deck easily and quickly, without the need for tools or having to hand loosen/tighten screw-on type locking hardware. Alignment arrows have been added to the outside edge of the base in case the hanger was to be aligned with an exact position marked on the wall at the time of the initial hang or during any adjustments. The bubble levels also assist in the placement of the hanger in either the vertical or horizontal directions. With the perpendicular placement, the bubble levels can be effectively used to hang a skateboard deck vertically or horizontally.

The hanger further has the advantage in that it does not significantly distract from or cover the skateboard deck graphic. In the preferred embodiment, the hanger will be manufactured as a ridged clear plastic device and the O-rings or any soft locking extensions would be manufactured in a soft clear plastic (e.g. silicone) to achieve the preferred minimal intrusive appearance. The O-ring's outer diameter was also sized accordingly, based on the typical diameter of a mounting hole for a skateboard, to provide the preferred minimal appearance and to still function as intended. Note that other hanger colors may ultimately be manufactured.

In broad embodiment, the present invention is a hanger for a skateboard that uses members with an end portion that engages the mounting holes of a skateboard. The end portion is the part of the member that can be inserted into the mounting holes of the skateboard deck. The members are mostly smooth but with an end that can make a small hole in the wrapping plastic upon insertion. Each end portion also contains one or more features that prevent the skateboard deck from sliding off the member. For example, an O-ring and or a plastic ledge may be placed on a smooth member to prevent displacement of the skateboard deck from the hanger. This locking extension on the end of the member prevents the skateboard deck from moving.

In broad embodiment, the present invention comprises a base for a hanger for a skateboard with the features, 2 or more alignment indicators, and at least two slots or holes for the members to hold the skateboard, a flat back configured to attach to a wall with the attachment means comprising: removable or permanent adhesive strips; an adhesive hook and loop combination; and liquid adhesive, drywall hook, screws, and screw type drywall anchors. The slots are designed to hold two members in a position perpendicular to the wall. The base can also be configured as a single unit with the slots being position holders for the members, with each member being fused into the base. The base is comprised of plastic, clear plastic, metal, a coated metal, or wood.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A hanging device for a skateboard, comprising:
   a set of pin members each with a top portion that engages a set of mounting holes of a skateboard deck, wherein: two pin members of the set of members engages with the set of mounting holes;
   a set of adhesive strips, further comprising: a set of side by side adhesive strips; or a set of hook and loop strips with adhesive backings,
   a base with a flat back, wherein: an outside edge of the hanger is also an outside edge of the flat back, and the set of adhesive strips runs from one side of the flat back to an opposite side of the flat back putting a set of tabs for said adhesive strips outside the outside edge of the hanger;
   wherein the bottom portion of each pin member has a T-shaped connection with the base with each side of the T forming a triangular support, each triangular support is connected with the base;
   wherein an attachment of the bottom portion of each pin member comprises a fusion with the base wherein the pin members are not removable from the base, or a locking attachment with the base wherein the pin members are separate from but lock into the base; and
   a set of marks on the base positioned on the outer edge of the base to assist in the alignment of multiple hangers.

2. The hanging device of claim 1, wherein the top portion of the set of pin members has a diameter small enough for the top portion to pass into the mounting holes of a skateboard, and one or more locking features that are characterized by:
   a locking portion with a point of minimum radius located in the center of each pin member wherein the pin member increases in diameter until a position proximate the end of the pin, at said position is a groove with a shape complimentary to an inside of an O-ring;
   a ledge on the top side of the top portion wherein the ledge is positioned to press against the skateboard deck once the skateboard deck is placed onto the hanger;
   a conical frustum with the tip of the pin member being a small end of the conical frustum and the opposite side forming the other end of a locking extension with a ledge; or
   a locking extension that rises from the tip of the top portion on at least one side with a gap underneath an opposite end of the locking extension, wherein the locking extension with the gap is comprised of a flexible material.

3. The hanging device of claim 2, wherein the top portion has a slight bend under the load of the skateboard deck such that the skateboard deck rests persistently on the locking extension of the pin members.

4. A hanging device for a skateboard of claim 1, further comprising:
   cavities to place bubble levels;
   oval holes for screws and drywall anchors.

5. A hanging device for a skateboard of claim 1, further comprising:
   a graphic insert that fits over top of the base wherein; the holes in the insert match up with a one or more features in the base.

6. A base for a skateboard hanging device of claim 5, wherein the graphic insert locks into the one or more features of the hanger base and has a finish that is a solid color or has a graphic design.

7. A hanging device for a skateboard of claim 1, wherein the composition of the base is selected from one or more of the following materials; clear plastic, coated plastic, metal, coated metal, wood, or paint.

8. The hanging device for a skateboard of claim 1, wherein the pin member is made from one or more materials comprising: clear plastic; opaque plastic; carbon fiber; metal; or metal coated with a plastic.

9. A device for hanging a skateboard deck with a set of 2 pin members, comprising:
   a bottom portion of each pin member comprising an attachment to a base, and a set of 2 or more flanges with a thickness that increases toward the base;
   a ledge on the top side of the top portion, and wherein the ledge is pointed away from the tip, and further is positioned with a small gap between the ledge and the central rod and directed away from the tip; and
   a conical frustum, wherein a tip of the pin member being a small end of the conical frustum and the large side of the conical frustum is where the ledge is formed;
   further comprising wherein a joint is formed at the attachment of each pin member to the base, the joint is either a fusion joint wherein the pin members are part of the base, or a locking joint with the base wherein the members are separate from but lock into the base;
   the base comprises cavities to place bubble levels and oval holes for screws and drywall anchors; and
   a graphic insert that fits over the top of the base.

10. The device of claim 9, wherein, the joint and the bottom portion of the pin member has a connection with a base in the shape characterized by: a T, a square, a cross, an oval, or a circle.

11. The device of claim 9, wherein the pin member is made from one or more materials comprising: clear plastic; opaque plastic; carbon fiber; metal; or metal coated with a plastic.

* * * * *